May 26, 1925.

E. R. LINEHAN

CONSTRUCTION BOLT

Filed March 3 1924

1,539,496

INVENTOR:
Edwin R. Linehan
BY A. M. Carlsen
ATTORNEY.

Patented May 26, 1925.

1,539,496

UNITED STATES PATENT OFFICE.

EDWIN R. LINEHAN, OF RIVER FALLS, WISCONSIN.

CONSTRUCTION BOLT.

Application filed March 3, 1924. Serial No. 696,550.

*To all whom it may concern:*

Be it known that I, EDWIN R. LINEHAN, a citizen of the United States, residing at River Falls, in the county of Pierce and State of Wisconsin, have invented certain new and useful Improvements in Construction Bolts, of which the following is a specification.

My invention relates to nutless construction bolts for either temporary or permanent use in structures of either wood or iron, but especially the latter.

Figure 1:
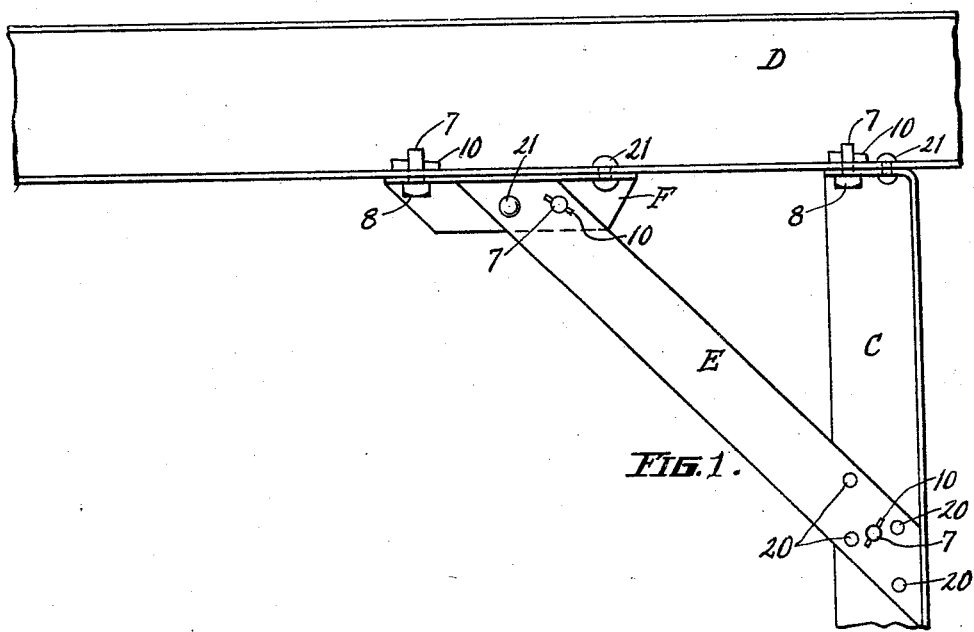
Fig. 1 is a side view representing a portion of a metal structure such as used in bridges, towers and metallic framework in buildings with my nutless bolt shown as used for temporary use until rivets can be inserted and finished.
Figure 2:
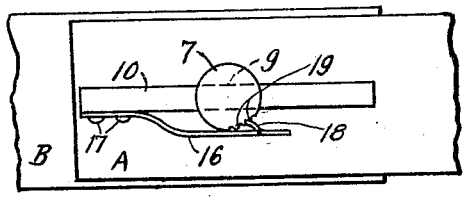
Fig. 2 is an end view of the bolt shown as passed through some parts and its locking means applied.

Referring to the drawing by reference numerals, the invention proper consists of a bolt 7 having at one end a head 8 and near its other end a diametrical slotted hole 9 for a flat pin 10 which is tapered so as to act as a wedge drawing tightly together the structural parts engaged between the wedge and the head of the bolt, as for instance the metal parts A, B in Fig. 2, or the post C, beam D, brace E and bracket F in Fig. 1.

Figure 3:
Fig. 3 is a side view of the wedge and its locking device in Fig. 2.

To prevent displacement of the wedge by jarring or hammering on the structure I provide a locking means which in Figs. 2 and 3 is shown to consist of a leaf spring 16 having one end secured at 17 to the wedge and its other end offset outwardly and provided with a tooth 18 arranged to engage in grooves 19 in one side of the bolt. This arrangement will prevent accidental displacement of the wedge.

The use of the nutless bolt has already been fairly explained, yet it may be further stated that in making steam boilers, ship hulls, house frames, bridges, etc., the parts to be riveted together are provided with rivet holes, as for instance the holes 20 in Fig. 1, before put into the structure and then hot rivets are put in and finished as 21, but before the rivets can be inserted the parts must be held in correct position, and this I do by a few of my temporary bolts 7 placed about as shown in Fig. 1. When some rivets have been inserted the bolts 7 are removed and rivets substituted.

It is obvious that my improved bolt saves much time during the erection of structures. The bolt is quickly applied for fastening all kinds of scaffold supporting brackets on walls, partitions and roofs during the erection and finishing of buildings and for securing fishplates on rail joints of either permanent or portable tracks.

What I claim is:

1. A headed construction bolt having spaced from its head a diametrical, slotted aperture, and a flat wedge shaped key adapted to be inserted in the aperture for the purposes set forth, and means secured on the key and adjustably engaging one side of the bolt to prevent accidental retraction of said key from the aperture.

2. A nutless bolt having at one end a head and near the other end a diametrical slotted aperture and longitudinal grooves in one of the outer sides of the apertured portion, a flat, edgewise wedge-shaped key adapted to be placed in the aperture for wedging articles together between it and the head of the bolt, and a leaf spring secured at one side of the key and having an offset toothed portion arranged to engage the grooves in the side of the bolt to prevent accidental retraction of the key.

In testimony whereof I affix my signature.

EDWIN R. LINEHAN.